United States Patent [19]
Cormany

[11] B 3,990,844
[45] Nov. 9, 1976

[54] METHOD OF REMOVING HYDROGEN PEROXIDE FROM DRYCLEANING SOLVENTS

[75] Inventor: Charles L. Cormany, Wadsworth, Ohio

[73] Assignee: PPG Industries, Inc., Pittsburgh, Pa.

[22] Filed: Dec. 11, 1973

[21] Appl. No.: 423,867

[44] Published under the second Trial Voluntary Protest Program on February 3, 1976 as document No. B 423,867.

[52] U.S. Cl. ................................. 8/142; 210/37 R; 423/584; 260/652 P; 252/170
[51] Int. Cl.² ..................... C01B 15/02; D06L 1/04; D06L 1/08
[58] Field of Search ............ 8/142; 210/37; 423/584

[56] References Cited
UNITED STATES PATENTS

| | | | |
|---|---|---|---|
| 2,801,224 | 7/1957 | Greer | 210/37 |
| 3,297,404 | 1/1967 | Elliott et al. | 210/37 |
| 3,679,590 | 1/1972 | Cormany et al. | 8/142 |

*Primary Examiner*—Allan Lieberman
*Attorney, Agent, or Firm*—Roger S. Benjamin

[57] ABSTRACT

Ion-exchange resins provide a convenient means for reducing the concentration of hydrogen peroxide in drycleaning solvents. The ion-exchange method is adaptable to automated drycleaning processes requiring removal of residual hydrogen peroxide from fabrics.

22 Claims, 1 Drawing Figure

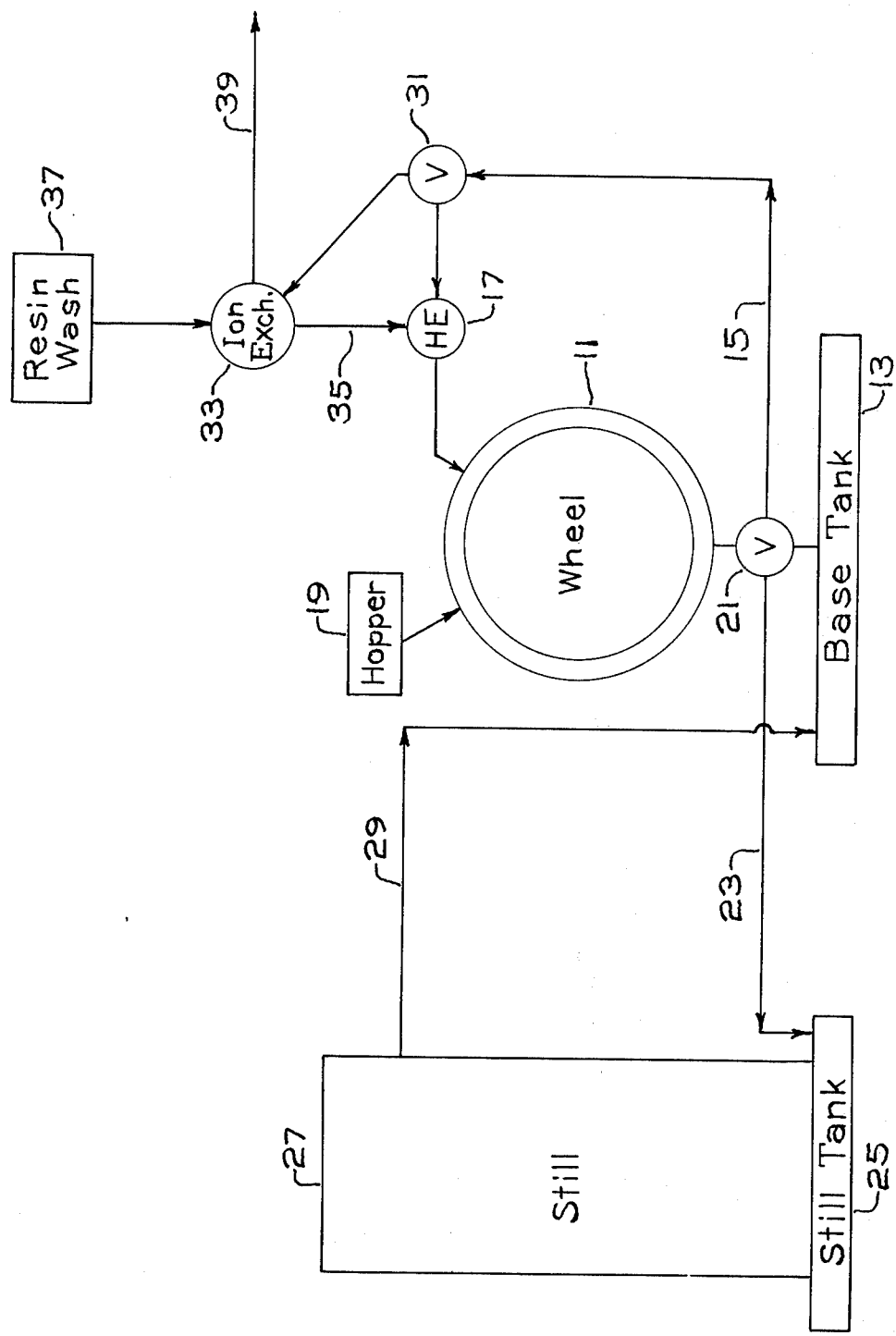

METHOD OF REMOVING HYDROGEN PEROXIDE FROM DRYCLEANING SOLVENTS

BACKGROUND OF THE INVENTION

Modern fabrics such as cotton-polyester are blends of natural and synthetic fibers. In typical prior art practice, cellulosic fibers such as cotton, linen, rayon, etc., are cleaned in aqueous systems employing bleaches. Action of the bleach is controlled through its dilution in the entire body of the aqueous media and by its efficient removal from the fabric by virtue of its solubility. In contrast, many fabrics composed of synthetic fibers respond best to "drycleaning" in an organic or chlorinated organic solvent media. More recently, drycleaning techniques have been developed to simultaneously remove both oleophilic and hydrophilic soils. For example, U.S. Pat. Nos. 3,635,667 and 3,679,590 describe drycleaning media comprising a continuous water-immiscible hydrocarbon phase and a discontinuous water phase containing a water-soluble bleach, e.g., hydrogen peroxide. A problem inherent in the use of such organic/aqueous bleach systems is that cellulosic fibers will preferentially retain hydrogen peroxide at concentrations which permit degradation. The above-cited patents solve the problem of residual hydrogen peroxide by using rinse solutions containing alcohols or adjusting the pH of the drycleaning bath to promote rapid reaction of the peroxide. In addition, my copending Application Ser. No. 351,730, filed Apr. 16, 1973, teaches the use of a rinse solution comprising waterimmiscible organic solvent and a detergent for more efficient peroxide extraction. Generally, the level of extracted hydrogen peroxide tends to build with each recycle of the rinse solution and gradually renders the rinse less effective in reducing hydrogen peroxide to acceptable levels.

THE INVENTION

The invention described herein is a method of continuously and conveniently removing hydrogen peroxide from a drycleaning solution by contacting said solution with an ion-exchange resin. The invention also teaches a method of removing hydrogen peroxide from fabrics by repeatedly extracting the fabric with a substantially peroxide free drycleaning solvent provided by contact with ion-exchange resins. It is also an aspect of this invention to describe improved methods of drycleaning fabrics which comprise the use of rinse cycles employing ion-exchange resins to remove undesirable hydrogen peroxide from the system.

DESCRIPTION OF THE INVENTION

The organic solvent forming the major constituent of the drycleaning media is selected from any of the conventional hydrocarbon or halogenated hydrocarbon liquids used for such purposes; for example, naphtha, stoddard solvent, perchloroethylene, trichloroethylene, methylchloroform, 1,1,3-trichlorotrifluoroethane, dichlorodifluoromethane, etc. The discontinuous water phase of the drycleaning media will normally constitute from about 0.1 to about 15 percent by weight water based on the weight of organic solvent component. Distribution of the aqueous phase throughout the water-immiscible organic portion is aided by detergents. Suitable detergents include the following:

Anionic Detergents

Anionic detergents which are suitable include various salts of alkyl sulfonates, sulfated and sulfonated amines and amides, phosphate esters, alcohol sulfates, ethoxylated alcohol sulfates, sulfonates of alkyl naphthalenes, sulfated ethoxylated alkyl phenols, sulfated fatty acid esters, sulfated and sulfonated oils and fatty acids, dodecyl and tridecyl benzene sulfonates, petroleum sulfonates and taurates.

In addition, alkyl, aryl or alkyl aryl phosphates in either the free acid or alkali metal salt form can be used. Other anionic detergents include the alkyl alkali metal sulfosuccinates, the alkali metal salts of the sulfate esters of alkylphenoxy poly(ethylenoxy) alcohol, the modified coconut diethanolamides, the amine salts of alkyl benzene sulfonic acids, high molecular weight alkyl aryl sulfonates and alkali metal salts thereof.

Additional anionic detergents useful in the present invention are sodium isopropylnaphthalene sulfonate, the dioctyl ester of sodium sulfosuccinic acid, sulfated castor oil, sodium alkylaryl sulfonate, sodium dioctylsulfosuccinate, the sodium salt of sulfated alkylphenoxypoly(ethyleneoxy)ethanol, sodium alkylnaphthalene sulfonate, sodium alkyl diaryl sulfonates, sodium-N-oleyl-taurate, sodium alkyl sulfosuccinate, sodium ethoxylated sulfosuccinate, sodium lauryl ether sulfates, sodium lauryl sulfates, sodium 2-ethylhexyl sulfate, tridecyl sodium sulfate, sodium N-methyl-N-oleyl-taurate and organic phosphate esters.

Anionic detergents are preferred in the practice of this invention since they tend to be highly effective in both the bleach and rinse cycles. Most preferred are the acid and alkali metal phosphate ester surfactants consisting of mixtures of monoester and diester derived from ethylene oxide adducts of aliphatic alcohols or alkylphenols. In particular, the compositions represented by the formulae:

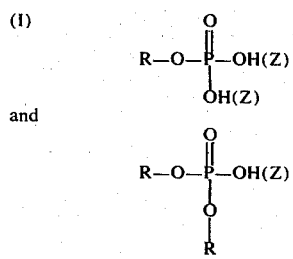

wherein

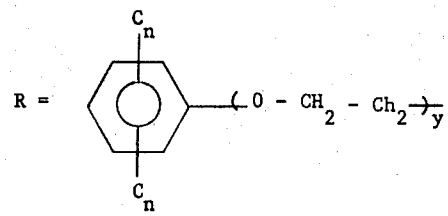

$Z$ = an alkali metal or hydrogen, preferably potassium.

$n$ = an integer from 6 to 12, preferably 9.

$y$ = an integer from 5 to 15, preferably 10.

(the phosphate ester where $Z = K$; $n = 9$; $y = 10$ is sold by the Wayland Chemical Division of Philip A. Hunt Chemical Corporation by the Trademark Wayfos DNP-10K).

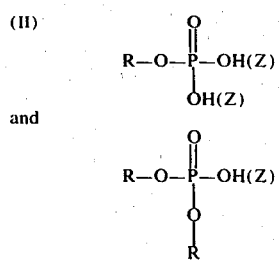

(II)

and wherein $R = C_nH_{2n+1}(O-CH_2-CH_2)_y$ $Z$ = an alkali metal or hydrogen, preferably potassium $n$ = an integer from 6 to 24, preferably 13

$y$ = an integer from 3 to 9, preferably 6 (the phosphate ester where $Z$ = hydrogen; $n$ = 13; $y$ = 6 is sold by the Wayland Chemical Division of Philip A. Hunt Chemical Corporation by the Trademark Wayfos 6 TD).

The phosphate ester detergent composition represented by formula I, supra is considered to have the best balance of properties for the practice of this invention where a single detergent composition is desired in both the washing and rinsing steps of the drycleaning cycle.

Cationic Detergents

Those cationic detergents which can be employed include the quaternary ammonium salts such as aliphatic dimethyl benzyl ammonium chlorides where the hydrocarbon chain is lauryl, cetyl, stearyl, and oleyl.

Dilauryl dimethyl ammonium chloride is also useful. Cyclic amines such as pyridine, picoline and butadiene may form the basis for useful quaternary salts such as, for example, lauryl pyridinium chloride. Those compositions which have been designed to combine germicidal power with detergency such as the polyalkylnaphthalene methyl pyridinium chlorides and the substituted benzyl:2:4-dichlorobenzyl dimethyl lauryl ammonium chlorides can be used. Other useful cationic detergents include the ethanolated alkylguanidine amine complexes, cetyl dimethylbenzyl ammonium chloride, cetyl trimethyl ammonium bromide, myristyl diethyl amine oxide and alkyl dimethyl amine oxide.

Non-Ionic Detergents

Non-ionic detergents useful in the process include the alkylphenoxy polyalkenoxy alkanols; alkanolamides; ethoxylated alcohols, amides, amines and fatty acids; glycerol esters and sorbitan derivatives.

Additional non-ionic detergents useful in the process of the instant invention include sorbitan monoleate, polyoxyethylene ether alcohols, alkyl phenoxy polyoxyethanols, and coconut diethanolamide, fatty alcohol polyglycol ether carboxylic acids, polyethylene glycol fatty esters, fatty alkylolamine condensates, coco amido propyl dimethyl amine oxide, sulfated esters of fatty alcohols, condensates of fatty alcohols with ethylene oxide, fatty alkylol amide condensates and alkyl polyoxyethylene ethers.

Detergents are employed at concentrations of 0.1 percent to 4 percent based on the weight of drycleaning solvent.

The hydrogen peroxide concentration in the drycleaning solvent should be related to the weight of fabric to be cleaned and bleached. Hydrogen peroxide concentrations are between 0.005 to 4 percent, preferably 0.08 to 1.5 percent (calculated as 100 percent $H_2O_2$) based on the weight of fabric. Adjustment of peroxide levels are dependent on variables such as contact time, temperature, nature of fabric, and soiling agent.

The ratio of drycleaning solvent to fabric is at least 0.75 gallons of solvent per pound of fabric, with a preferred range of 1 to 2.5 gallons of solvent per pound of fabric treated.

Temperatures range from room temperature to near the boiling point of the drycleaning media. Contact time for the wash solution with the fabric is preferably less than 1 hour and typically 10 to 20 minutes.

A variety of ion-exchange resins find application for hydrogen peroxide removal. Use of the term "ion-exchange resin" encompasses the use of a combination of resin forms and types in the practice of this invention. The ion-exchange resins commonly take the form listed below:

| Ion-Exchange Resin Type | Typical Ion-Exchange Resin Functionality | Representative Trademark Products |
| --- | --- | --- |
| Strong Basic | Quaternary Ammonium —N(CH$_3$)$_3$$^+$ (Type I) Cl$^-$ OH$^-$, SO$_4$$^=$ | Amberlite IRA 400 (Rohm and Haas Co.) Dowex 1-X8 |
| Strong Basic | Quaternary Ammonium —N(CH$_3$)$_2$$^+$ Cl$^-$ CH$_2$—CH$_2$OH (Type II) | Amberlite IRA-910, IRA-410 (Rohm and Haas Co.) |
| Weak Base | Free Base, Cl$^-$ SO$_4$$_=$ | |
| Strong Acid | Sulfonic H$^+$, Na$^+$ | Dowex 50W-X8 (Dow Chemical Co.) |
| Weak Acid | —CO$_2$$^-$ H$^+$, Na$^+$ | Amberlite IRC-50 (Rohm and Haas Co.) |
| Adsorbent Type Resins | Nonionic | Amberlite XAD-7 (Rohm and Haas Co.) (Acrylic Ester) |

The preferred resin is the strong basic type wherein the functional group is quaternary ammonium, i.e., a nitrogen atom bonded to four organic radicals. The most common resins of this type are known as Type I and Type II resins. In the Type I resins, the nitrogen is bonded to a benzene ring through a CH$_2$ group and to three methyl groups. The Type II resin is similar except for the replacement of one methyl group with an ethanol group.

The quaternary ammonium group, which carries a positive charge, is normally in the chloride form, i.e., the anion associated with the cationic quaternary group is chloride. However, in the practice of the instant invention, the anionic form of the resin is not critical. For example, other anions such as $CNS^-$, $I^-$, $NO_3^-$, $Br^-$, $CN^-$, $HSO_4^-$, $HSO_3^-$, $NO_2^-$, $Cl^-$, $HCO_3^-$, $OH^-$ and $F^-$ may be associated with the quaternary ammonium grouping.

The capacity of the ion-exchange resin to remove hydrogen peroxide is renewed by washing the resin with water. Hydrogen peroxide is removed intact from the resin column by the water wash indicating adsorption activity by the resin. Additionally, organic solvent (e.g., alcohols, ketones) may be used alone or in admixture with water to remove the hydrogen peroxide from the resin column. If desired, chemical agents reactive with hydrogen peroxide (e.g., sodium sulfite; Fuller's Earth) can be dissolved or suspended in the resin wash to facilitate hydrogen peroxide removal.

Parameters of ion-exchange materials such as particle size and degree of crosslinking may be selected on the basis of desired flow rates, operating temperature or mechanical requirements. Preferred resins contain backbones of crosslinked, thermosetting styrene based polymers characterized by their insolubility in both aqueous and non-aqueous media. In addition to styrene and certain modifying agents, the resins contain a minor proportion of a polyfunctional crosslinking material which bridges the linear polymer molecules thereby producing a three-dimensional, insoluble, infusible polymer network. Compounds which can be used to crosslink the styrene polymer include but are not limited to p,p'-divinylbiphenyl, vinyl methacrylate, acrylic anhydride, allyl methacrylate, diallyl maleate, diallyl itaconate, a 2-chloroallyl ester containing two ethylenic linkages and allyl cinnamate. The preferred crosslinking agent is divinylbenzene. Generally, the styrene base resins begin to soften at temperatures above 100°C.

The quantity of ion-exchange resin required for a given system is dependent on (1) the $H_2O_2$ adsorption capacity of the particular resin and (2) the quantity of hydrogen peroxide to be removed. In practice, the parameter (1) is a constant and (2) is more conveniently related to the volume of drycleaning solvent (which employs a fixed percentage of $H_2O_2$). Thus, in our experimental apparatus, 15 pounds of Amberlite IRA-400 resin (strong base anionic quaternary ammonium type) was used in conjunction with 30 gallons of drycleaning solvent charged with 0.4 percent of 35 percent $H_2O_2$. The system was operated at a flow rate of 30 gallons per minute.

Although ion-exchange resins are an essential element in the method herein disclosed, the invention should not be construed as based on any theory of ion-exchange activity.

DETAILED DESCRIPTION OF THE INVENTION

The experiments are conducted in a 20 pound Detrex coin-op dry-cleaning unit modified by the addition of a stainless steel wheel assembly (for additional corrosion resistance), an oversize still, solvent heat exchangers, and valves and pipes necessary to provide complete flexibility of operation.

The system includes provision for continuous solvent purification and maintenance and the entire operation is adaptable to card or other automatic programming. No special chemicals other than hydrogen peroxide and a detergent are necessary.

The bleach operation is started with a 5-minute break run using 0.75 weight percent detergent charged solvent. This operation is performed with solvent recirculation through the wheel and heat exchangers.

The break run provides an opportunity to heat the solvent without direct loss of time. At the end of this cycle the solvent and wheel temperature should be about 160°F. The break run time required can be shortened or lengthened by appropriate adjustment of the heat exchanger steam pressure.

When the required solvent temperature is reached, the circulating pump turns off and the bleach cycle is started by the addition of 0.4 percent by weight of 35 percent hydrogen peroxide and 15 percent by weight water (based on weight of fabric) through the soap hoppers. The work load mills for 15 minutes during which time the temperature drops about 5°–10°F. At this point, wheel solvent hydrogen peroxide concentrations are about 50 ppm and fabric peroxide residues are in the range of 2,000 ppm.

The discarded solvent is distilled and the recovered distillate returned to the main storage tank where it is recharged with 0.75 percent detergent.

The room temperature rinse cycle may be conducted with 0.75 percent detergent charged solvent direct from the main storage tank. This is accomplished by filling the wheel, circulating for 2 minutes through the fabric load and an external ion-exchange resin bed followed by dumping back to the main storage tank. A second and third 2-minute rinse conducted under the same conditions completes the cycle.

At the end of this operation, the hydrogen peroxide content of the solvent has been reduced to less than 10 ppm and the fabric residues are typically below 80 ppm, with 100 ppm being the highest acceptable limit.

The invention as shown in the drawing operates as follows:

The wheel 11 is charged with fresh solvent from the base tank 13 and a load of fabric. The cleaning cycle begins with a five minute "break run" wherein solvent is cycled from the wheel via line 15 through heat exchanger 17 back into the wheel. In approximately 5 minutes the temperature of the wheel is brought to about 160°F. and circulation of the drycleaning fluid is stopped. Thereafter, an aqueous solution of hydrogen peroxide is introduced through hopper 19 and the contents of the wheel comprising heated solvent, fabric and hydrogen peroxide are milled for 15 minutes. After milling, the used wash solution is separated from the fabric and sent by valve 21 via line 23 into still tank 25. Purified solvent is returned from still 27 via line 29 to base tank 13.

The fabric which remains in the wheel after milling is subjected to a first two-minute rinse. The first rinse is performed by drawing solvent from the base tank into the wheel and then circulating the rinse via valve 21 line 15 and valve 31 through heat exchanger 17 until the rinse solvent temperature is reduced to a point where it will not damage the ion-exchange resin (typically, 100°F.). Thereafter, the peroxide contaminated rinse solvent withdrawn from the wheel is sent by valve 21 through line 15 via valve 31 to ion-exchange column 33 and then by line 35 through heat exchanger 17 back to the wheel. Circulation of the rinse solution through the ion-exchange resin continues throughout the rinse cycle. At the conclusion of the first rinse cycle, the rinse solution is separated from the fabric and withdrawn by valve 21 into base tank 13. A second and third two-minute rinse sequence is then performed using fresh rinse solvent from base tank 13. The second and third rinses do not require pre-cooling and the rinse solution is continuously cycled through the ion-exchange resin.

After the third rinse, the wheel is spun to effect mechanical removal of contained solvent. A drying cycle of 15 minutes at 145°–160°F. completes the drycleaning sequence. The garments are processed dry and odor free in 40–45 minutes.

Periodically, the hydrogen peroxide adsorbing capacity of the ion-exchanger resin column 33 must be renewed by washing with water or other wash solutions stored in resin wash tank 37 and expelling the resin wash solution through line 39.

EXAMPLE I

This example illustrates the effect of hydrogen peroxide concentration on resin absorption.

Experiments were carried out using perchloroethylene containing 0.4 weight percent, 1.0 weight percent, and 2.0 weight percent of 35 percent $H_2O_2$, respectively, (% $H_2O_2$ based on weight of solvent). Circulation of 30 gallons of drycleaning solution through a 15 pound bed of strongly basic anionic resin with quaternary ammonium functionality and a styrene-divinylbenzene backbone (Amberlite IRA-400 resin) at a rate of 30 gallons per minute gave results which are expressed by $H_2O_2$ concentration as a function of time in Table 1.

TABLE 1

| Time (Minutes) | $H_2O_2$ (ppm) 0.4% $H_2O_2$ | 1.0% $H_2O_2$ | 2.0% of $H_2O_2$ |
| --- | --- | --- | --- |
| 0 | 50.6 | 121.0 | 250.8 |
| 1 | 19.8 | 52.8 | 105.6 |
| 2 | 15.4 | 41.8 | 85.4 |
| 3 | 13.2 | 30.8 | 70.4 |
| 4 | 12.1 | 26.4 | 61.6 |
| 5 | 9.9 | 22.0 | 49.5 |
| 7 | 6.6 | 18.7 | 41.8 |
| 9 | 6.6 | 15.4 | 33.0 |
| 16 | 6.6 | 13.2 | 23.1 |
| 20 | 5.5 | 8.8 | 22.0 |

It can be seen from the results that higher $H_2O_2$ levels in the solvent can be reduced to acceptable levels, although a longer period of circulation is required.

EXAMPLE II

This experiment illustrates the effect on peroxide removal of increasing the resin charge.

Another series of experiments were run using the volume and flow rate of drycleaning solvent recited in Example I, three levels of $H_2O_2$ (35% capacity) concentration (0.4 weight percent, 1.0 weight percent and 2.0 weight percent based on weight of solvent). The amount of Amberlite IRA-400 ion-exchange resin was increased from 15 pounds to 18.5 pounds. The results of these experiments are set out in Table 2.

TABLE 2

| Time (Minutes) | $H_2O_2$ (ppm) 0.4% $H_2O_2$ | 1.0% $H_2O_2$ | 2.07% of $H_2O_2$ |
| --- | --- | --- | --- |
| 0 | 57.2 | 114.4 | 246.4 |
| 1 | 26.4 | 55.0 | 101.2 |
| 2 | 17.6 | 41.8 | 79.2 |
| 3 | 13.2 | 34.1 | 68.8 |
| 4 | 11.0 | 33.0 | 52.6 |

TABLE 2-continued

| Time (Minutes) | $H_2O_2$ (ppm) 0.4% $H_2O_2$ | 1.0% $H_2O_2$ | 2.07% of $H_2O_2$ |
| --- | --- | --- | --- |
| 5 | 8.8 | 26.4 | 46.2 |
| 7 | 8.4 | 19.8 | 33.0 |
| 9 | 6.6 | 17.6 | 30.8 |
| 15 | 4.4 | 13.2 | 22.0 |
| 20 | 4.4 | 9.9 | 20.9 |

Results of these experiments revealed that an increase in the resin bed of 3.5 pounds ( ~ 20 percent) did not appreciably increase the $H_2O_2$ removal efficiency of the resin at all levels tested.

EXAMPLE III

This experiment illustrates the effect on peroxide removal of decreasing the resin charge.

An experiment was conducted in the manner of Example II using a 7.5 pound bed of resin. The solvent contained 0.4 percent $H_2O_2$ (based on weight of solvent using 35% $H_2O_2$). Table 3 sets out concentration of $H_2O_2$ in ppm as a function of time.

TABLE 3

| Time (Minutes) | $H_2O_2$ (ppm) |
| --- | --- |
| 0 | 50.6 |
| 1 | 26.4 |
| 2 | 26.4 |
| 3 | 24.2 |
| 4 | 24.2 |
| 5 | 23.1 |
| 7 | 23.1 |
| 9 | 18.7 |
| 15 | 15.4 |
| 20 | 14.3 |

The results show a marked drop in the $H_2O_2$ solvent removal efficiency in that the level was reduced to only 23.1 ppm after 5 minutes of continuous recirculation and 14.3 ppm after 20 minutes.

EXAMPLE IV

This example illustrates the effect of temperature on a resin bed.

An increase in the temperature of the solvent as a potential means of increasing the $H_2O_2$ solvent removal efficiency was investigated. The resin used was Amberlite IRA-400. Hydrogen peroxide at 0.4 weight percent (of 35% $H_2O_2$ based on weight of solvent) concentration was circulated at a rate of 30 gallons per minute through a 15 pound bed or ion-exchange resin. The solvent was steam heated to a temperature of 130°F. Although the efficiency of the resin was significantly increased (reducing the $H_2O_2$ concentration to only 8.8 ppm in 2 minutes of continuous recirculation), the heated solvent had a softening effect on the resin and allowed for poor solvent flow.

EXAMPLE V

This example illustrates the effect of repeated operations on the capacity of the resin to remove peroxide.

A study was conducted using the solvent combination of Example I at 75°F. with 0.4 weight percent $H_2O_2$ (based on weight or solvent — 35% $H_2O_2$) in order to determine if several consecutive runs could be made without regenerating the resin. The results of this experiment in which 5 consecutive 15 minute runs were made without regeneration are set out in Table 4. Solvent was passed through the 15 pound resin bed on each run at a rate of 30 gallons per minute.

TABLE 4

| Time (Minutes) | $H_2O_2$ (ppm) | |
|---|---|---|
| | First Run | Fifth Run |
| 0 | 55.0 | 59.4 |
| 1 | 26.4 | 35.2 |
| 3 | 19.8 | 28.6 |
| 5 | 14.3 | 24.2 |
| 9 | 8.8 | 22.0 |
| 15 | 5.5 | 17.6 |

EXAMPLE VI

The physical properties of various ion-exchange resins tested are set out in Table 5.

Ion-exchange resins were tested for effectiveness in removing $H_2O_2$ by the following procedure. A glass column 3 centimeters in diameter and 10 centimeters in length was filled with approximately 85 grams of the resin under examination. The resin charged column was rinsed with 300 milliliters of perchloroethylene containing 0.75 percent (based on the volume of solvent) Wayfos DNP-10K detergent. Portions of peroxide containing test solution had the following formulation:

124 milliliters perchloroethylene
1.50 milliliters of $H_2O$
0.04 milliliter of 35 percent $H_2O_2$
0.75 percent (based on volume of solvent) Wayfos DNP-10K.

The efficiency of a given resin for removal of peroxide is determined by the amount of peroxide remaining in the solvent after it has been passed over the resin. Table 6 sets out the results of this determination.

For each resin tested five 124 milliliter portions of perchloroethylene $H_2O_2$ test solution were prepared according to the above formula. Then, each of the five portions of test solution was slowly and consecutively passed through the column of resin under test. After passage of each portion (viz., X1 to X5 in Table 6), the test solution was analyzed for residual hydrogen peroxide. Following the treatment with peroxide containing test solution, the column was drained and five 124 milliliter portions of distilled water were passed through the resin column. Analysis for contained $H_2O_2$ was performed on each portion of distilled water. Thus, both the hydrogen peroxide removal capacity and the ability of the resin to be regenerated by water washing was measured.

In the preceding Examples quantitative analysis of hydrogen peroxide was made by the following procedure:

Fifty milliliters of peroxide containing drycleaning solvent was added to 200 milliliters of $H_2O$ containing 0.05 grams of manganous sulfate and 20 milliliters of 20 percent $H_2SO_4$. The mixture was titrated with 0.1N $KMnO_4$ until a pink color persisted.

$$\% H_2O_2 = \frac{0.017 \times \text{Normality of } KMnO_4 \times 100}{\text{Volume of Solvent} \times \text{Specific Gravity of Solvent}}$$

TABLE 5
Physical Properties of Various Polymeric Ion Exchange and Adsorbent Resins

| | Product Identification (Trade Name) | Functionality | Ionic Form | Sizes | Porosity Volume % | Surface Area $m^2$/gram | Average Pore Diameter - A | Exchange Capacity (a) Wt., Capacity, Meg./g.-Dry (b) Vol. Capacity, meg./ml.-Wet |
|---|---|---|---|---|---|---|---|---|
| 1 | Amberlite IRA-400 (Styrene - DVB) | Quaternary Ammonium $-N(CH_3)_3 + Cl^-$ (Type I) | Strongly Basic Anion Exchange Chloride | 0.38–0.45 (mm.) | 0 | 0 | 0 | (a) — (b) 1.4 30.5 Kgrs.$CaCO_3$/ft.$^3$ |
| 2 | Amberlite IRA-400 OH (Amberlite IRN-78) | Nuclear Grade Version of IRA-400, High Purity Grade, Low Metals (Impurities) Content | | | | | | |
| 3 | Amberlyst A-26$^1$ (Macroreticular Styrene - DVB) | Quaternary Ammonium $-N(CH_3)_3 + Cl^-$ (Type I) | Strongly Basic Anion Exchange Chloride | 0.45–0.55 (mm.) | — | 25–30 | 400–700 | (a) 4.1–4.4 (b) 0.95–1.1 |
| 4 | Amberlite IRA-425 (Styrene - DVB) | Quaternary Ammonium $-N(CH_3)_3 + Cl^-$ (Type I) | Strongly Basic Anion Exchange Chloride | 0.90–1.15 (mm.) | 0 | 0 | 0 | (a) — (b) 1.35 29.4 Kgrs. $CaCO_3$/ft.$^3$ |
| 5 | Amberlite IRA-458 (Acrylic - DVB) | Quaternary Ammonium $-N(CH_3)_3 + Cl^-$ (Type I) | Strongly Basic Anion Exchange Chloride | 0.40–0.51 (mm.) | 0 | Very Low (0) | 0 | (a) — (b) 1.25 27.2 Kgrs. $CaCO_3$/ft.$^3$ |
| 6 | Dowex 1-X8 (Styrene - DVB) | Quaternary Ammonium $-N(CH_3)_3 + Cl^-$ (Type I) | Strongly Basic Anion Exchange Chloride | 20–50 Mesh | 0 | 0 | 0 | (a) — (b) 1.31 |
| 7 | Amberlite XE-279 | — | — | — | — | Slight | — | — |
| 8 | Dowex 21K | Quaternary Ammonium $-N(CH_3)_3 + Cl^-$ (Type I) | Strongly Basic Anion Exchange | 20–50 Mesh | — | — | — | (a) 3.6 (b) 1.3 |

TABLE 5 -continued
Physical Properties of Various Polymeric Ion Exchange and Adsorbent Resins

| | Product Identification (Trade Name) | Functionality | Ionic Form | Sizes | Porosity Volume % | Surface Area m²/gram | Average Pore Diameter - A | Exchange Capacity (a) Wt., Capacity, Meg./g.-Dry (b) Vol. Capacity, meg./ml.-Wet |
|---|---|---|---|---|---|---|---|---|
| 9 | Amberlyst A-27[2] (Macroeticular Styrene - DVB) | Quaternary Ammonium —N(CH₃)₃ + Cl⁻ (Type I) | Strongly Basic Anion Exchange Chloride | 0.40–0.50 (mm.) | 45–60 | 60–70 | 400–800 | (a) 2.60 min. (b) 0.70 min. |
| 10 | Amberlite XAD-2 (Polystyrene Base Polymeric Adsorbent) | None | Nonionic | 20–50 Mesh | 42 | 330 | 90 | None |
| 11 | Amberlite XAD-7 (Acrylic Ester Base Polymeric Adsorbent) | None | Nonionic | 20–50 Mesh | 55 | 450 | 80 | None |
| 12 | Dowex 50W-X8 (Styrene - DVB) | Sulfonic | Strongly Acid Cation Exchange Hydrogen | 50–100 Mesh | — | — | — | (a) 5.0 (b) 1.8 |

[1] Amberlyst A-26 = Similar to IRA-400, except that it has a discrete pore structure.
[2] Amberlyst A-27 = Higher surface area than A-26, less functionality than A-26, higher degree of crosslinking than A-26.

TABLE 6

Evaluation of Various Polymeric Ion Exchange and Adsorbent Resins for $H_2O_2$ Removal from Solvent Bleaching Rinse Operations
$H_2O_2$ Content in Solvent/Water Effluent (100% Basis, % OWG)[1][2]

| | | X1 Pass | X2 Pass | X3 Pass | X4 Pass | X5 Pass |
|---|---|---|---|---|---|---|
| 1 | Amberlite IRA-400 | | | | | |
| | [1]124 ml. Solvent Pass | <0.0021 | <0.0021 | <0.0021 | <0.0021 | <0.0021 |
| | 124 ml. H₂O Pass | 0.3480 | 0.1231 | 0.0552 | 0.0340 | 0.0148 |
| 2 | Amberlite IRA-400 (OH) (Amberlite IRN-78, Nuclear Grade) | | | | | |
| | [1]124 ml. Solvent Pass | 0.0032 | 0.0032 | 0.0032 | 0.0032 | 0.0032 |
| | 124 ml. H₂O Pass | 0.3137 | 0.1301 | 0.0560 | 0.0284 | 0.0112 |
| 3 | Amberlyst A-26 | | | | | |
| | [1]124 ml. Solvent Pass | <0.0021 | <0.0021 | 0.0064 | 0.0042 | 0.0127 |
| | 124 ml. H₂O Pass | 0.06947 | 0.0777 | 0.0148 | 0.0064 | <0.0021 |
| 4 | Amberlite IRA-425 | | | | | |
| | [1]124 ml. Solvent Pass | <0.0021 | 0.0064 | 0.0064 | 0.0127 | — |
| | 124 ml. H₂O Pass | 0.1592 | 0.0912 | 0.0594 | 0.0382 | 0.0233 |
| 5 | Amberlite IRA-458 | <0.0021 | <0.0021 | <0.0064 | <0.0106 | <0.0191 |
| | | 0.3013 | 0.1464 | 0.0658 | 0.0297 | 0.0127 |
| 6 | Dowex 1-X8 | | | | | |
| | [1]124 ml. Solvent Pass | 0.0042 | 0.0064 | 0.0042 | 0.0191 | Plugged |
| | 124 ml. H₂O Pass | 0.2334 | 0.1507 | 0.0637 | 0.0276 | 0.0170 |
| 7 | Amberlite XE-279 HP | | | | | |
| | [1]124 ml. Solvent Pass | 0.0085 | 0.0127 | 0.0148 | 0.0191 | 0.0191 |
| | 124 ml. H₂O Pass | 0.3692 | 0.1485 | 0.0552 | 0.0233 | 0.0148 |
| 8 | Dowex 21K | | | | | |
| | [1]124 ml. Solvent Pass | 0.0106 | 0.0148 | 0.0148 | 0.0170 | 0.0148 |
| | 124 ml. H₂O Pass | 0.2164 | 0.1443 | 0.0764 | 0.0424 | 0.0127 |
| 9 | Amberlyst A-27 | | | | | |
| | [1]124 ml. Solvent Pass | 0.0158 | 0.0090 | 0.0222 | 0.0252 | 0.0252 |
| | 124 ml. H₂O Pass | 0.1267 | 0.0791 | 0.0657 | 0.0526 | 0.0413 |
| 10 | Amberlite XAD-2 | | | | | |
| | [1]124 ml. Solvent Pass | 0.0148 | 0.0390 | 0.0645 | 0.0785 | Plugged |
| | 124 ml. H₂O Pass | 0.1870 | 0.0424 | 0.0170 | 0.0615 (Overnight) | 0.0021 |
| 11 | Amberlite XAD-7 | | | | | |
| | [1]124 ml. Solvent Pass | 0.0191 | 0.0191 | 0.0297 | 0.0467 | 0.0488 |
| | 124 ml. H₂O Pass | 0.0482 | 0.0785 | 0.0212 | <0.0064 | — |
| 12 | Dowex 50W-X8 | COMPLETE REMOVAL OF H₂O₂ - SLOW FLOW RATE - NO PASSAGE | | | | |

[1]Each bath initially contained 124 ml. of perchloroethylene containing 0.75% (OVS) Wayfos DNP-10K, 0.4% (OWG) of 35% $H_2O_2$, and 15% (OWG) $H_2O$. OWG = On the weight of the goods. OWS = On weight of the solvent.
[2]$H_2O_2$ (100%) content on the basis of a 20:1 liquor-to-goods ratio and a theoretical 10-gram fabric sample.

I claim:
1. A method of removing minor concentrations of hydrogen peroxide from liquid chlorinated drycleaning solvents which comprises contacting a synthetic cross-linked ion-exchange resin with said solvent until said solvent has a lower hydrogen peroxide concentration.

2. The method of claim 1 wherein the ion-exchange resin is a strongly basic anionic resin with quaternary ammonium functionality.

3. The method of claim 1 wherein the chlorinated drycleaning solvent comprises perchloroethylene.

4. The method of claim 1 wherein the ion-exchange resin is contained as a porous bed and hydrogen peroxide is removed from drycleaning solvent by one or a plurality of passes through said bed.

5. The method of claim 1 wherein, first, the contact of the drycleaning solvent with the ion-exchange resin is terminated; and then, the resin is washed with a wash solution comprising water, which wash solution is thereafter discarded; and subsequently, contact of the drycleaning solvent and resin is restored.

6. The method of claim 5 wherein the sequence of contacting resin with drycleaning solvent and washing the resin to remove accumulated hydrogen peroxide is repeated.

7. A method of treating fibers which comprises contacting the fibers with a cleaning bath having as its principal components a continuous phase of substantially water-immiscible chlorinated organic drycleaning solvent which constitutes a major portion of the bath and having dispersed therein and constituting a minor portion of the bath, a discontinuous and distinct aqueous phase comprising hydrogen peroxide and water substantially immiscible in the organic drycleaning solvent, terminating contact between the fibers and the bath when treatment has reached the desired level; then rinsing the fibers in a rinse cycle with a rinse solution comprising water immiscible chlorinated organic solvent containing none or a smaller proportion of hydrogen peroxide than the cleaning bath to extract hydrogen peroxide from the fibers, the improvement which comprises; contacting the rinse solution containing hydrogen peroxide with a synthetic crosslinked ion-exchange resin to remove hydrogen peroxide in the rinse solution, recycling the hydrogen peroxide purified rinse solution to the rinsed fibers, and repeating the sequence of ion exchange resin contact and rinsing cycle until an acceptable level of residual hydrogen peroxide in the fibers is obtained.

8. The method of claim 7 wherein the ion-exchange resin is a strongly basic anionic resin with quaternary ammonium functionality.

9. The method of claim 7 wherein the chlorinated organic dry-cleaning solvent comprises perchloroethylene.

10. The method of claim 9 wherein the perchloroethylene dry-cleaning solvent contains a detergent consisting essentially of alkali metal salt form phosphate esters of an ethylene oxide-alkylphenol adduct.

11. The method of claim 7 wherein, first, the contact of the rinse solution with the ion-exchange resin is terminated; and then, the resin is washed with a wash solution comprising water, which wash solution is thereafter discarded; and subsequently, contact of rinse solution and resin is restored.

12. The method of claim 7 wherein the composition of the rinse solution is substantially identical to the composition of the cleaning bath, except that the rinse solution has none or a smaller proportion of the hydrogen peroxide contained in the cleaning bath.

13. The process of claim 7 wherein each rinse cycle is from 1 to 8 minutes.

14. The process of claim 7 wherein cellulosic fibers are treated.

15. A method of removing hydrogen peroxide from fibers which comprises the steps of:
contacting the fibers with a liquid composition having as its main constituent a water-immiscible chlorinated organic drycleaning solvent for a time sufficient to remove a portion of the hydrogen peroxide contained in the fibers, separating the drycleaning solvent from the fibers, and thereafter;

b. contacting the hydrogen peroxide containing drycleaning solvent with a synthetic crosslinked ionexchange resin for a time sufficient to absorb a portion of contained hydrogen peroxide and thereafter;

c. recycling the purified drycleaning solvent as a rinse to the fibers; and d. repeating the sequential series of steps (a), (b), and (c) until fibers having the desired residual hydrogen peroxide content are obtained.

16. The method of claim 15 wherein the ion-exchange resin of step (b) is a strongly basic anionic resin having quaternary ammonium functionality.

17. The method of claim 15 wherein the liquid composition of step (a) contains a detergent and, optionally, a discontinuous and distinct aqueous phase.

18. The method of claim 17 wherein the detergent consists essentially of alkali metal salt form phosphate esters of an ethylene oxide-alkylphenol adduct.

19. The method of claim 15 wherein the water-immiscible chlorinated organic drycleaning solvent is perchloroethylene.

20. The method of claim 15 wherein the contact of hydrogen peroxide containing drycleaning solvent in step (b) is terminated and the ion-exchange resin is treated with a wash solution comprising water, which wash solution is then discarded; and, subsequently, contact of the drycleaning solvent and the resin is restored.

21. The method of claim 15 applied to cellulosic fibers.

22. The method of claim 15 wherein the ion-exchange resin treated rinse solution of step (c) has a lower hydrogen peroxide content than the used rinse solution of step (a).

* * * * *